United States Patent [19]

Friend

[11] Patent Number: 4,830,095
[45] Date of Patent: May 16, 1989

[54] TEMPERATURE CONTROL SYSTEM FOR AIR CONDITIONING SYSTEM

[76] Inventor: Dennis M. Friend, 1101 Forest Hills, Gladewater, Tex. 75647

[21] Appl. No.: 170,144

[22] Filed: Mar. 18, 1988

[51] Int. Cl.$^4$ ............................................. F24F 3/044
[52] U.S. Cl. ...................................... 165/22; 165/25; 236/1 B; 236/49.5
[58] Field of Search ................. 165/22, 25; 236/49 D, 236/1 B, 1 C

[56] References Cited

U.S. PATENT DOCUMENTS

| | | | |
|---|---|---|---|
| 3,004,709 | 10/1961 | Hays | 236/1 C |
| 3,154,247 | 7/1961 | Carlson | 236/9 |
| 3,297,250 | 1/1967 | Capps | 236/1 C |
| 3,724,534 | 4/1973 | Weatherston | 165/12 |
| 4,009,825 | 3/1977 | Coon | 165/22 |
| 4,243,174 | 1/1981 | Moeller et al. | 236/49 |
| 4,324,288 | 4/1982 | Karns | 165/22 |
| 4,406,397 | 9/1983 | Kamata et al. | 165/22 |
| 4,407,447 | 10/1983 | Sayegh | 236/49 |
| 4,530,395 | 7/1985 | Parker et al. | 236/49 |
| 4,600,144 | 7/1986 | Zelczer | 165/22 |
| 4,673,029 | 6/1987 | Beachboard | 165/22 |

FOREIGN PATENT DOCUMENTS

| | | | |
|---|---|---|---|
| 1187966 | 5/1985 | Canada | 165/22 |
| 0043140 | 3/1982 | Japan | 165/22 |

Primary Examiner—Albert W. Davis, Jr.
Assistant Examiner—John K. Ford
Attorney, Agent, or Firm—Arthur F. Zobal; James C. Fails; Geoffrey A. Mantooth

[57] ABSTRACT

A temperature control system for an air conditioning system that services plural zones provides priority of one or more selected zones of the conditioned air flow relative to the other unselected zones. Priority is achieved by closing those dampers associated with the unselected zones to direct the conditioned air flow into the selected zones. The temperature control system also provides for fail-safe operation by utilizing dampers biased in the open position and by preventing all dampers from being closed at the same time when conditioned air is flowing.

15 Claims, 3 Drawing Sheets

TEMPERATURE CONTROL SYSTEM FOR AIR CONDITIONING SYSTEM

FIELD OF THE INVENTION

The present invention relates to temperature control systems for air conditioning systems that service plural zones.

BACKGROUND OF THE INVENTION

In an air conditioning system utilizing zone temperature control, the spaces which are heated or cooled are divided into zones. Each zone has a thermostat which controls the position of a respective damper in the air duct servicing the respective zone. Temperature control is achieved by regulating the flow of conditioned air into the zone by the respective damper. Zone temperature control provides more precise temperature regulation in all of the spaces which are heated or cooled than does single point control wherein thermostats control only the operation of the fan and the heating and cooling compartment.

Even with zone temperature control, problems may arise in certain instances. For example, where the air conditioning unit is undersized for the building, one or more zones may receive less than adequate amounts of conditioned air. This undersupply problem can be compensated for, however, by providing those zones that would be undersupplied priority of the conditioned air flow over the other zones. Priority of one or more zones over the other zones can also be utilized to compensate for installations of air conditioning systems having inadequate ducting. Still another instance that can be compensated for through the use of priority is where the zone has a varying heat load, as in for example, a room having a western wall exposed to the afternoon summertime sun.

It is therefore an object of the present invention to provide a temperature control system for an air conditioning system wherein one or more zones can be given priority of conditioned air flow over the other zones in the air conditioning system.

DESCRIPTION OF PREFERRED EMBODIMENT

Figure 1:
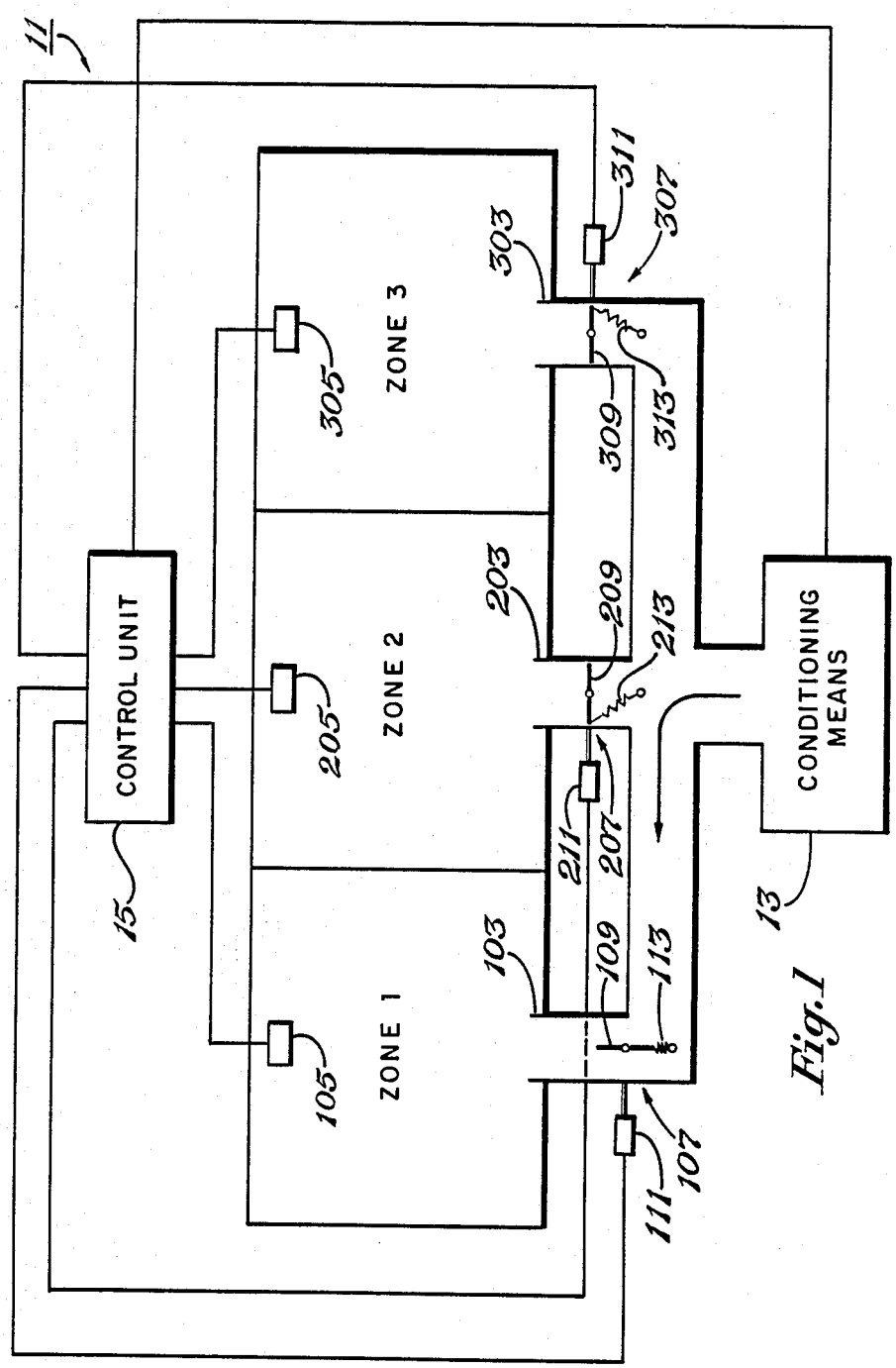
FIG. 1 is a schematic drawing showing a plural air conditioning system, incorporating the temperature control system of the present invention, in accordance with a preferred embodiment.

In FIG. 1, there is shown a schematic drawing of an air conditioning system 11 that incorporates the temperature control system of the present invention, in accordance with a preferred embodiment. The air conditioning system 11 includes, in addition to the temperature control system of the present invention, conditioning means 13 for producing conditioned air, zones 1, 2, and 3, and air ducts 103, 203, 303 connecting the conditioning means 13 to each zone. The return air ducts are not shown.

The conditioning means 13, which is conventional, includes a blower fan, and either a heating unit, or a cooling unit, or both. The temperature control system of the present invention is designed to operate with a variety of air conditioning systems that have either heating or cooling, or both, including those types of air conditioning systems utilizing heat pumps. In the preferred embodiment, the conditioning means provides both heating and cooling by way of an electric heating unit and an electric cooling unit. (The nomenclature used hereinafter is adopted for such a conditioning means.) The conditioned air is moved into the zones through the air ducts 103, 203, 303 by way of the blower fan (not shown) in the conditioning means 13.

The temperature control system of the present invention includes temperature sense means 105, 205, 305, damper means 107, 207, 307, and a control unit 15. In the preferred embodiment, the temperature sense means are conventional thermostats 105, 205, 305 having outputs for the blower fan, heat, cool, and accessory (which is used either for a heat pump or for one stage in a two stage heater). Each zone is provided with a thermostat. The outputs of the thermostats are connected to the control unit 15. Each zone also has an associated damper means 107, 207, 307. Each damper means has a damper 109, 209, 309 positioned in the respective air duct 103, 203, 303 and a solenoid 111, 211, 311 to move the damper. Each damper 109, 209, 309 is operable to move between a closed position wherein conditioned air is prevented from entering the respective zone and an open position wherein conditioned air is allowed to enter the respective zone. Each damper is normally open, being biased by springs 113, 213, 313 in the open position. The dampers are actuated to move to the closed position by the respective solenoids 111 211. 311. Thus, when power is removed from the respective solenoid, the respective damper moves to the open position. The solenoids 111, 211, 311 are electrically connected to the control unit 15.

Figure 3:
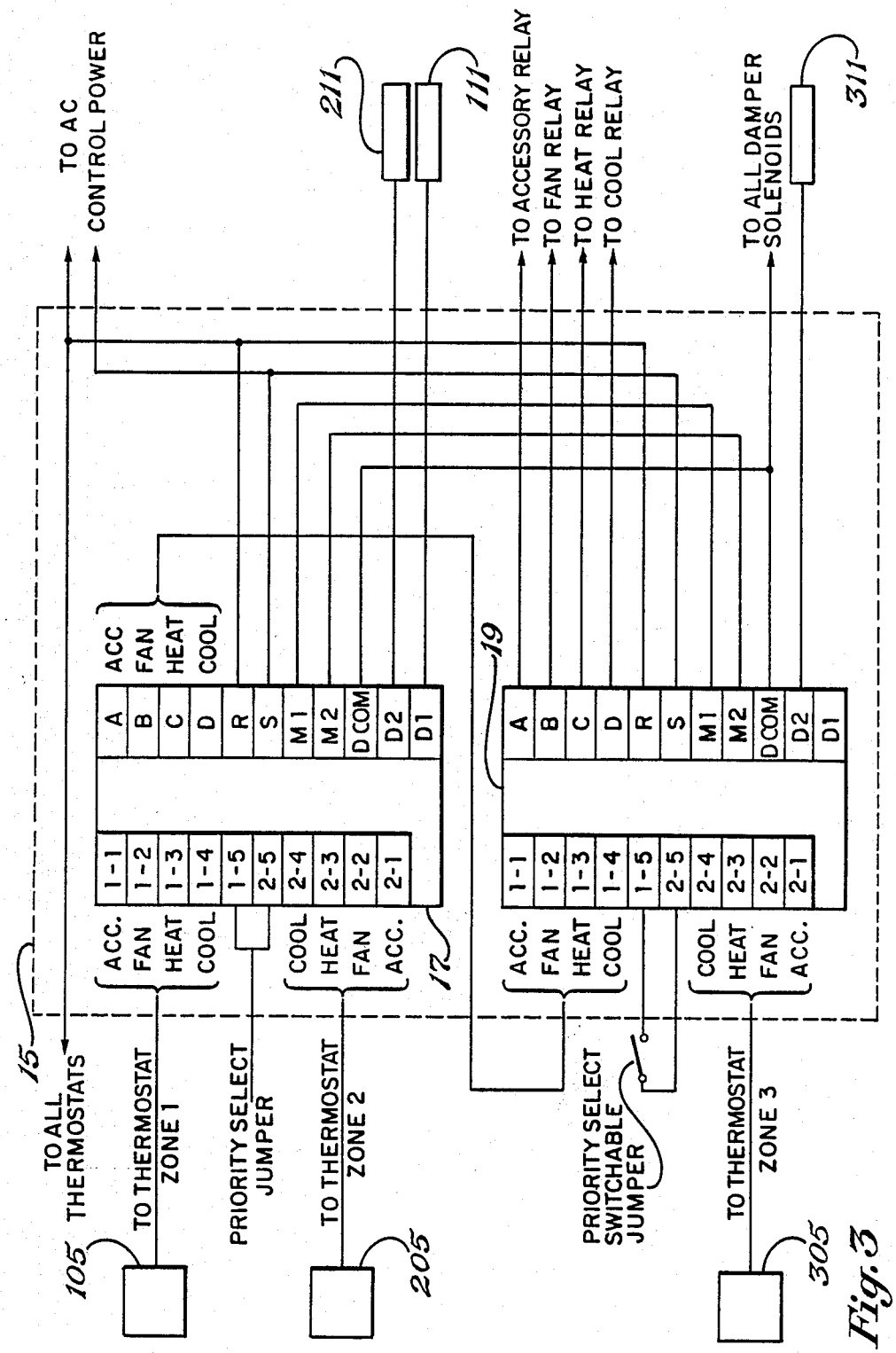
FIG. 3 is an electrical schematic drawing of the control unit connections for a three zone air conditioning system.

The control unit 15 for the air conditioning system 11 of FIG. 1 includes first and second electronic circuit boards 17, 19 (see FIG. 3). The two circuit boards are similar to one another, differing only in their external connections. Generally, a circuit board receives inputs from a first thermostat at terminals 1-1, 1-2, 1-3, 1-4; a second thermostat at terminals 2-1, 2-2, 2-3, 2-4; the priority select conductor or jumper at terminals 1-5, 2-5 (optional if priority is selected); and 24V ac power at terminals R and S. The outputs of each circuit board are: accessory at terminal A, blower fan at terminal B, heat at terminal C, cool at terminal D; first and second circuit board interconnection conductors at respective terminals M1 and M2; and a first damper solenoid at terminals D1 and DCOM and a second damper solenoid at terminals D2 and DCOM.

As shown in FIG. 3, the first circuit board 17 is connected to the zone 1 termostat 105, the zone 2 therostat 205, the zone 1 damper solenoid 109, and the zone 2 damper solenoid 211. The second circuit board 19 is connected to the zone 3 thermostat 305, the zone 3 damper 309, the first circuit board 17, and the conditioning means 13.

Figure 2:
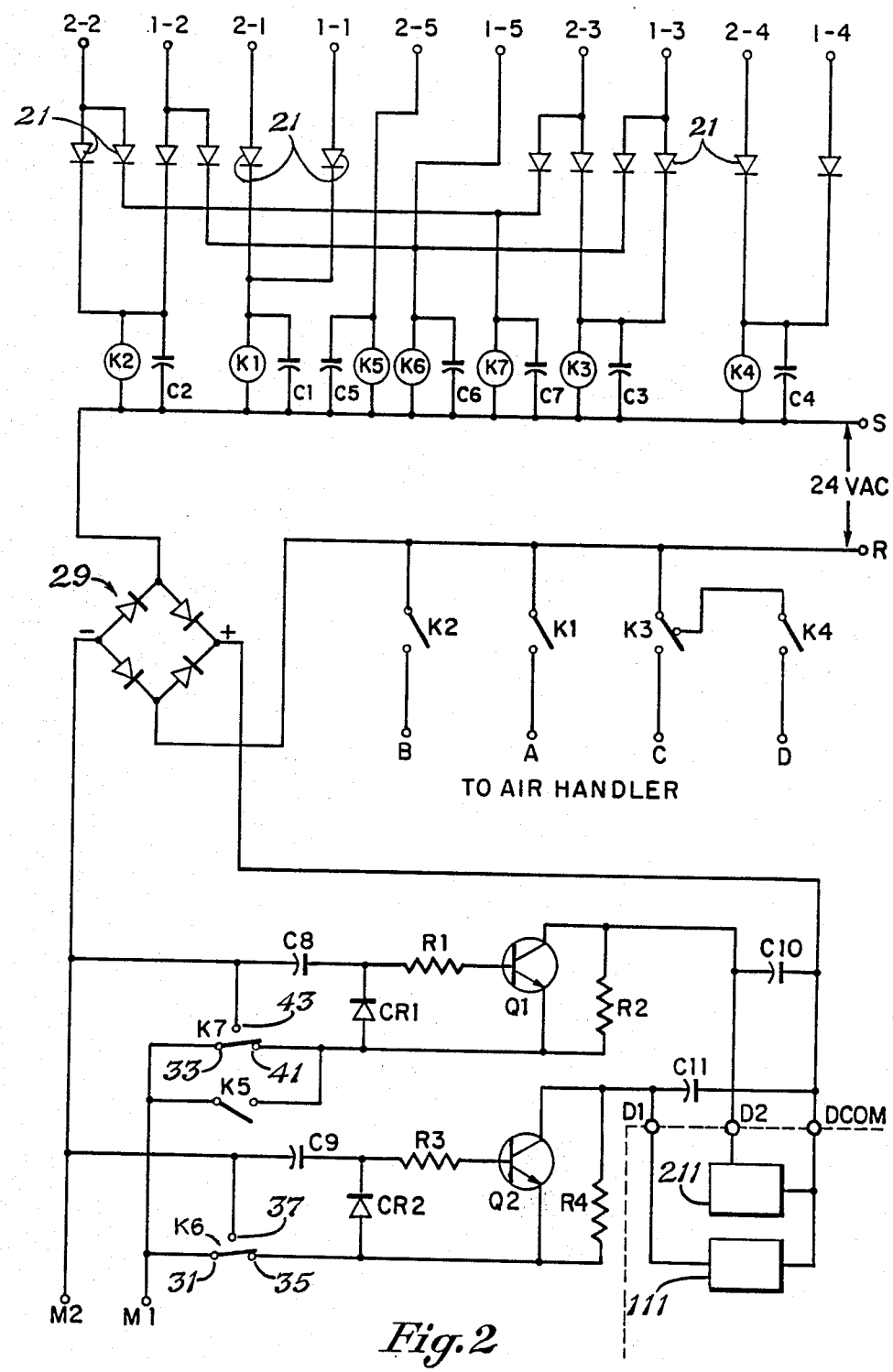
FIG. 2 is an electrical schematic diagram of a circuit board of the control unit of the temperature control system of FIG. 1.

In FIG. 2 there is shown an electrical schematic diagram of a circuit board. For ease of description, the electrical circuit of FIG. 2 will be described with reference to the first circuit board 17. The circuit on the first circuit board 17 includes a detection portion, a conditioning means actuation portion, and a damper actuation portion.

The detection portion includes a plurality of relay coils to which the outputs from the zone 1 and zone 2 thermostats 105, 205 are connected. The outputs from the zone 1 and zone 2 thermostats are connected to the relay coils in the following manner: the accessory outputs from both thermostats are connected to the coil of relay K1 at terminals 1-1, 2-1; the fan outputs from both thermostats are both connected to the coil of relay K2 at terminals 1-2, 2-2; the heat outputs from both thermostats are connected to the coil of relay K3 at terminals 1-3, 2-3; the cool outputs from both thermostats are connected to the coil of relay K4 at terminals 1-4, 2-4; the fan output and the heat output from the zone 1 thermostat, and one end of the priority select conductor or jumper (if priority is selected) are connected to the coil of relay K6 at respective terminals 1-2, 1-3, 1-5; the fan output and the heat output from the zone 2 thermostat are connected to the coil of relay K7 at respective terminals 2-2, 2-3; and the other end of the priority select conductor (again, if priority is selected) is connected to the coil of relay K5 at terminal 2-5. All of the relay coils are connected to the power bus which is connected to terminal S. Filter capacitors C1–C7 are connected in parallel across the respective relay coils. The zone 1 and zone 2 thermostats 105, 205 are isolated from one another by diodes 21 which are connected in series with the respective inputs from the thermostats. The diodes 21 also serve as half wave rectifiers to power the relay coils.

The conditioning means actuation portion includes the switches of relays K1, K2, K3, and K4. The respective switches are actuated by energizing the respective relay coils, thereby operating the respective function in the conditioning means. Thus, the switch of relay K2 operates the blower fan, the switch of relay K3 operates the heating unit, the switch of relay K4 operates the cooling unit, and the switch of relay K1 operates whatever is connected to the accessory function (as mentioned hereinabove, either a heat pump or one stage in a two stage heater).

The damper actuation portion includes switches for opening and closing the dampers and a quick turn-on portion for each damper solenoid. Each damper has a switch that controls its opening and closing. The switch of relay K6 and the switch of relay K5 control the zone 2 damper solenoid 211 and the switch of relay K7 controls the zone 1 damper solenoid 111. The ac power provided at terminals R and S is rectified by a diode rectifier 29 to provide dc power to the damper solenoids 111, 211. The switches of relay K5, K6, K7 control the energization of the damper solenoids 111, 211 by making or breaking the connection to the dc power supply. The switch of relay K6 is connected in the following manner: the common terminal 31 is connected to the common terminal 33 of the switch of relay K7 and to the circuit board terminal M1, the normally closed terminal 35 is connected to resistor R4 which is in series with the zone 1 damper solenoid 111, and the normally open terminal 37 is connected to the negative terminal of the diode rectifier 29. The switch of relay K7 is connected in the following manner: the common terminal 33 is connected to the common terminal 31 of the switch of relay K6, the normally closed terminal 41 is connected to resistor R2 which is in series with the zone 2 damper solenoid 211, and the normally open terminal 43 is connected to the negative terminal of the diode rectifier 29. The switch of relay K5 is connected in parallel to the normally closed and common terminals 41, 33 of the switch of relay K7. The damper solenoids 111, 211 are connected to th positive terminal of the rectifier 29. Filter capacitors C10 and C11 are connected in parallel across the respective damper solenoids.

The quick turn-on portion for each damper solenoid includes transistors Q1, Q2 connected in parallel with the current limiting resistors R2, R4.

Referring to FIGS. 1 and 2, the operation of the temperature control system will now be described with respect to zones 1 and 2 and the first circuit board 17. Initially, the operation of the temperature control system will be described without a priority select conductor connected to terminals 1-5, 2-5. In the preactuation mode, which is the mode the circuit is in before receiving any signals from the thermostats 105, 205, capacitors C8 and C9 are charged through respective diodes CR1, CR2, resistors R2, R4 and damper solenoids 111, 211. The charging current for each capacitor is insufficient to energize the damper solenoids, thus allowing the dampers to remain in the open position. When the zone 1 thermostat 105 detects a need for conditioned air in zone 1, current is applied through terminal 1-2, to the coil of relay K2, wherein the switch of relay K2 is closed to start the blower fan. Current is also applied, through terminal 1-2, to the coil of relay K6, thereby switching the switch of relay K6 to the normally open terminal 37. The switching completes the circuit through the zone 2 damper solenoid 211, transistor Q1 and resistor R2, the switch of relay K7, and the switch of relay K6. The zone 2 damper solenoid 211 is energized, closing the zone 2 damper 209 and directing the air into zone 1. When the switch of relay K6 is moved to the normally open terminal 37, transistor Q1 initially short circuits resistor R2, thus allowing current, which is two to three times the rated continuous solenoid current, to flow through the zone 2 damper solenoid 211. This excessive current ensures the closing of the damper 209. The transistor Q1 is switched on by the capacitor C8 and resistor R1. As the capacitor C8 discharges, the transistor Q1 gradually turns off, wherein the current flowing through the resistor R2 increases in inverse proportion to the current flowing through, transistor Q1. At steady state, the current flowing through the damper solenoid 211 is limited by resistor R2 to the continuous rated solenoid current. The transistor Q1 thus effects a ramping type of quick turn-on of the damper solenoid. After zone 1 is satisfied of its need for conditioned air, the zone 1 thermostat 105 switches off current to the first control circuit board 17, thereby opening the switch of relay K2 and turning off the blower fan, and switching the switch of relay K6 back to the normally closed terminal 35 which breaks the circuit to the zone 2 damper solenoid 211 and causes the zone 2 damper 209 to open. The damper 209 is returned to the open position by the spring 213.

Likewise, whenever the zone 2 thermostat 205 detects a need for conditioned air in zone 2, current is applied, through terminal 2-2, to the coil of relay K2 to start the blower fan, and to the coil of relay K7 to close the zone 1 damper 109.

When both of the zone 1 and the zone 2 thermostats 105, 205 detect a need for conditioned air, current is applied to terminals 1-2 and 2-2, thus energizing the coils of relays K2, K6, and K7. The switch of relay K2 closes to start the blower fan and the switches of relays K6 and K7 move to the normally open terminals 37, 43. Since both of the switches of relays K6 and K7 have switched, both of the zone 1 and zone 2 dampers 109,209 remain open.

Priority of zone 1 over zone 2 may be selected by shorting together terminals 1-5 and 2-5 with a priority select conductor. This ties the energization of relay K5 to the energization of relay K6. Thus, whenever both of the zone 1 and the zone 2 thermostats 105, 205 detect a need for conditioned air in their respective zones, the movement of the switches of relays K6 and K7 to the normally open terminals 37,43 is in conjunction with the closing of the switch of relay K5. The closing of the switch of relay K5 completes the circuit of the zone 2 damper solenoid 211, through transistor Q1 and resistor R2, the switch of relay K5, and the switches of relays K6 and K7. Thus, the zone 2 damper 209 closes, directing conditioned air to zone 1.

In FIG. 2, relays K6 and K7 are shown to be connected not only to the thermostat outputs for activating the blower fan, but also to the thermostat outputs for activating the heating unit in the conditioning means 13. The thermostat outputs for activating the heating unit are utilized to control the dampers because in some air conditioning systems, particularly those systems only having heating capability and no cooling capability, the blower fan is activated by the thermostat heating signal.

In FIG. 3, the interconnection of the first and second circuit boards 17, 19 are shown. The outputs A, B, C, and D of the first circuit board 17 are connected to the inputs of the second circuit board 19 in the same manner that a thermostat would be. Thus, the first circuit board outputs A, B, C, and D are connected to the second circuit board inputs at respective terminals 1-1, 1-2, 1-3, and 1-4. Terminals M1 and M2 of the first circuit board 17 are connected to the respective terminals M1 and M2 of the second circuit board 19. Terminals D2 and DCOM of the second circuit board are connected to the zone 3 damper solenoid 311. Second circuit board outputs A, B, C, and D are connected to the respective functions of the conditioned means 13.

Referring to all of the Figs. when priority select conductors are used on both circuit boards, shorting respective terminals 1-5, 2-5, zone 1 has priority over zones 2 and 3, and zone 2 has priority over zone 3. Thus, when all three zones need conditioned air, the control unit 15 closes the zone 2 and zone 3 dampers 209, 309. The zone 2 damper closes as described hereinabove; the zone 3 damper closes because the switches of relays K5, K6, K7 on the second circuit board 19 all move to the normally open terminals. When zones 2 and 3 need conditioned air, the control unit 15 closes the zone 3 damper 309, again because the switches of relays K5, K6, and K7 on the second circuit board 19 all move to the normally open terminals. When the terminals 1-5, 2-5 on the first circuit board are shorted, but not those on the second circuit board, zone 1 has priority over zone 2, and zone 3 is independent of zones 1 and 2. Thus, when all three zones need conditioned air, the control unit 15 only closes the zone 2 damper 209. The zone 3 damper 309 does not close because the switch of relay K5 on the second circuit board 19 remains open. When the terminals 1-5, 2-5 on the second circuit board are shorted, but not those on the first circuit board, zones 1 and 2 are independent of one another and either has priority over zone 3. When none of the terminals 1-5, 2-5 on the first and second circuit boards are shorted, all zones operate independently of one another.

The assignment of priority to one or more zones can be either permanent by using wire jumpers to short circuit the respective terminals 1-5, 2-5, or can be made temporary by providing respective switches for shorting and unshorting the respective terminals 1-5, 2-5.

More than 3 zones can be serviced by the temperature control system of the present invention by merely adding circuit boards for the additional zones and interconnecting the additional circuit boards in the same manner as the second circuit board. The temperature control system can service 2 zones by removing the second circuit board.

In the preferred embodiment, the resistors R2 and R4 are 25 to 50 ohms. The lower resistors are used when more current is required as in, for example, when a large fan blower is used and more power is required to hold the dampers closed.

In addition to providing priority, the temperature control system of the present invention interlocks the dampers to prevent the situation where all of the dampers are closed with the fan and either the heating unit or the cooling unit in operation. Air flow through the heating unit or cooling unit would be blocked by the closed dampers, with damage to the heating or cooling unit resulting from temperature extremes likely to occur. But with the temperature control system of the present invention, air flow through the heating and cooling unit is always assured because the dampers operate out of the fail-safe open position and the control unit does not allow all dampers to be closed at the same time.

The temperature control system of the present invention can be retrofitted into an existing air conditioning system or installed with a new air conditioning system. Retrofitting is simplified by the minimal amount of wiring involved. The temperature control system utilizes power from the existing air conditioning system, thereby preventing operation of the temperature control system independently of the air conditioning system.

The foregoing disclosure and showing made in the drawings are merely illustrative of the principles of this invention and are not to be interpreted in a limiting sense.

What is claimed is:

1. An electrical temperature control system for an air conditioning system servicing plural zones, said air conditioning system having conditioning means for producing conditioned air, comprising:
   a. each of said zones having temperature sense means for sensing the temperature and for detecting a need for conditioned air in the respective zone;
   b. each of said zones having an associated damper means for regulating the amount of conditioned air flowing from said conditioning means into the respective zone; each of said damper means operable to move between a closed position wherein conditioned air is prevented from entering said respective zone and an open position wherein conditioned air is allowed to enter said respective zone;
   c. a control unit for controlling the activation of said conditioning means and the production of conditioned air and for controlling the position of each of said damper means, said control unit being responsive to each of said temperature sense means so as to activate said conditioning means when a need for conditioned air is detected by any of said temperature sense means; said control unit being connected to each of said temperature sense means, each of said damper means, and said conditioning means;

d. said control unit comprises select means for selecting the priority of one or more of said zones to form selected zones, the other of said zones being unselected zones, said selected zones maintaining their priority status over unselected zones regardless of which zones need conditioned air;

e. said control unit also comprises priority means for preempting the flow of conditioned air from said unselected zones and supplying the air flow to said selected zones whenever said selected zones need air, said priority means providing said selected zones priority of conditioned air flow over said unselected other zones when both selected zones and unselected zones need conditioned air by causing the respective damper means associated with said unselected zones to be in the closed position thereby preventing air flow into said unselected zones while causing the respective damper means associated with said selected zones to be in the open position thereby allowing air flow into aid selected zones;

f. said priority means providing conditioned air flow to said unselected zones whenever said unselected zones need conditioned air and said selected zones do not need conditioned air by causing the respective damper means associated with said unselected zones to be in the open position and the respective damper means associated with the selected zones to be in the closed position.

2. The temperature control system of claim 1, wherein each of said damper means is biased in the open position and said control unit operates the damper means out of the open position to move to the closed position.

3. The temperature control system of claim 2, wherein said damper means are interlocked together by said control unit so that when said conditioning means is operating, at least one damper means is in the open position.

4. The temperature control system of claim 2 wherein:

a. said priority means comprises plural switch means, each of said switch means being connected with a respective damper means and a power supply, said priority means being connected with each of said temperature sense means said respective switch means being responsive to said respective temperature sense means, wherein when a respective switch means is closed the associated damper means is moved to the closed position;

b. said priority means controlling said respective switch means so that when the selected zones require conditioned air the respective switch means connected with the respective damper means in the unselected zones are closed so as to move said respective damper means in the unselected zones to the closed position and the respective switch means connected with the respective damper means in the selected zones are opened so as to maintain the respective damper means in the selected zones in the open position;

c. said priority means controlling said respective switch means so that when the unselected zones require conditioned air and the selected zones do not require conditioned air the respective switch means connected with the respective damper means in the selected zones are closed so as to move said respective damper means in the selected zones to the closed position and said respective damper means in the unselected zones are left in the open position;

d. said priority means comprising a bypass switch means connected in parallel with each of said switch means connected with a damper means in an unselected zone, said priority means controlling said respective bypass switch means so that when selected zones and unselected zones require conditioned air at the same time, the respective bypass switch means is closed so as to move said respective damper means in the unselected zones to the closed position.

5. The temperature control system of claim 4 wherein said select means can be changed alternately between an on mode and an off mode, wherein when said select means is in its on mode priority of one or more zones is selected, when said select means is in its off mode all of said zones have equal priority of conditioned air flow.

6. The temperature control system of claim 1 wherein said select means can be changed alternately between an on mode and an off mode, wherein when said select means is in its on mode priority of one or more zones is selected, when said select means is in its off mode all of said zones have equal priority of conditioned air flow.

7. The temperature control system of claim 1 wherein:

a. said air conditioning system services at least three zones;

b. said select means allows the selection from said selected zones of a first priority zone and a second priority zone, said third zone being unselected;

c. said priority means providing for the first priority zone to receive conditioned air over the second priority zone and the unselected zone when all zones need conditioned air; said priority means providing for the second priority zone to receive conditioned air over the unselected zone when both the second priority zone and the unselected zone need conditioned air and the first priority zone does not need conditioned air.

8. The temperature control system of claim 7 wherein:

a. each of said damper means is biased in the open position and said control unit operates the damper means out of the open position to move to the closed position;

b. said priority means comprises plural switch means, each of said switch means being connected with a respective damper means and a power supply, said priority means being connected with each of said temperature sense means, said respective switch means being responsive to said respective temperature sense means, wherein when a respective switch means is closed the associated damper means is moved to the closed position;

c. said priority means controlling said respective switch means so that when the selected zones require conditioned air the respective switch means connected with the respective damper means in the unselected zones are closed so as to move said respective damper means in the unselected zones to the closed position and the respective switch means connected with the respective damper means in the selected zones are opened so as to maintain the respective damper means in the selected zones in the open position;

d. said priority means controlling said respective switch means so that when the unselected zones require conditioned air and the selected zones do not require conditioned air the respective switch means connected with the respective damper means in the selected zones are closed so as to move said respective damper means in the selected zones to the closed position and said respective damper means in the unselected zones are left in the open position;

e. said priority means comprising a bypass switch means connected in parallel with each of said switch means connected with a damper means in an unselected zone, said priority means controlling said respective bypass switch means so that when selected zones and unselected zones require conditioned air at the same time, the respective bypass switch means is closed so as to move said respective damper means in the unselected zones to the closed position.

9. The temperature control system of claim 8 wherein said priority means comprises first and second modules with each module serving groups of zones and containing said respective switch means, said first module containing switch means serving a first zone and a second zone, said second module containing switch means serving a third zone and the combination of said first and second zones, wherein said modularization allows for ease of connecting said plural zones to said control unit.

10. An electrical temperature control system for an air conditioning system servicing two zones, said air conditioning system having conditioning means for producing conditioned air comprising:

a. each of said zones having temperature sense means for sensing the temperature and for detecting a need for conditioned air in the respective zone;

b. each of said zones having an associated damper means for regulating the amount of conditioned air flowing from said conditioning means into the respective zone; each of said damper means operable to move between a closed position wherein conditioned air is prevented rom entering said respective zone and an open position wherein conditioned air is allowed to enter said respective zone;

c. a control unit for controlling the activation of said conditioning means and the production of conditioned air and for controlling the position of each of said damper means, said control unit being responsive to each of said temperature sense means so as to activate said conditioning means when a need for conditioned air is detected by either of the temperature sense means; said control unit being connected to search of said temperature sense means, each of said damper means, and said conditioning means;

d. said control unit comprising select means for selecting the priority of one of said zones to form a selected zone, the other of said zones being an unselected zone, said selected zone maintaining its priority status over said unselected zone regardless of which zone needs conditioned air;

e. said control unit also comprises priority means for preempting the flow of conditioned air from said unselected zone and supplying the air flow to said selected zone whenever said selected zone needs air, said priority means providing said selected zone priority of conditioned air flow over said unselected zone when both zones need conditioned air by causing the damper means associated with said unselected zone to close thereby preventing air flow into said unselected zone while causing the damper means associated with said selected zone to open thereby allowing air flow into said selected zone;

f. said priority means providing conditioned air flow to said unselected zone whenever said unselected zone needs conditioned air and said selected zone does not need conditioned air by causing the damper means associated with said unselected zone to be in the open position and the damper means associated with said selected zone to be in the closed position.

11. The temperature control system of claim 10, wherein each of said damper means is biased in the open position and said control unit operates the damper means out of the open position to move to the closed position.

12. The temperature control system of claim 11 wherein:

a. said priority means comprises two switch means, each of said switch means being connected with a respective damper means and a power supply, said priority means being connected with each of said temperature sense means, said respective switch means being responsive to said respective temperature sense means, wherein when a respective switch means is closed the associated damper means is moved to the closed position;

b. said priority means controlling said respective switch means so that when the selected zone requires conditioned air the respective switch means connected with the damper means in the unselected zone is closed so as to move said damper means in the unselected zone to the closed position and the respective switch means connected with the damper means in the selected zone is opened so as to maintain the damper means in the selected zone in the open position;

c. said priority means controlling said respective switch means so that when the unselected zone require conditioned air and the selected zone does not require conditioned air the respective switch means connected with the damper means in the selected zone is closed so as to move said damper means in the selected zone to the closed position and said damper means in the unselected zone is left in the open position;

d. said priority means comprising a bypass switch means connected in parallel with said switch means connected with the unselected zone, said priority means controlling said bypass switch means so that when the selected zone and unselective zone require conditioned air at the same time, the bypass switch means is closed so as to move said damper means in the unselected zone to the closed position.

13. The temperature control system of claim 12 wherein said select means can be changed alternately between an on mode and an off mode, wherein when said select means is in its on mode priority of one zone is selected, when said select means is in its off mode all of said zones have equal priority of conditioned air flow.

14. The temperature control system of claim 10 wherein said select means can be changed alternately between an on mode and an off mode, wherein when said select means is in its on mode priority of one zone is selected, when said select means is in its off mode all of said zones have equal priority of conditioned air flow.

15. An electrical temperature control system for use with an air conditioning system servicing plural zones, said air conditioning system having conditioning means for producing conditioned air, comprising:

a. a control unit for controlling the activation of said conditioning means and the production of conditioned air, said control unit adapted to be connected with a temperature sense means in each zone and with a damper means in each zone and with said conditioning means, said temperature sense means for sensing the temperature and for detecting a need for conditioned air in the respective zone, said damper means for regulating the amount of conditioning air flowing into the respective zone, each of said damper means operable to move between open and closed positions, said control unit adapted to being responsive to each of said temperature sense means so as to activate said conditioning means when a need for conditioned air is detected by any of said temperature sense means;

b. said control unit comprises select means adapted for selecting the priority of one or more of said zones to form selected zones, the other of said zones being unselected zones, said select means adapted to maintain the priority status of said selected zones over said unselected zones regardless of which zones need conditioned air;

c. said control unit also comprises priority means adapted for preempting the flow of conditioned air from said unselected zones and supplying the air flow to said selected zones whenever said selected zones need air, said priority means adapted to provide said selected zones priority of conditioned air flow over said unselected other zones when both selected zones and unselected zones need conditioned air by causing the respective damper means associated with said unselected zones to be in the closed position thereby preventing air flow into said unselected zones while causing the respective damper means associated with said selected zones to be in the open position thereby allowing air flow into said selected zones;

d. said priority means adapted to provide conditioned air flow to said unselected zones whenever said unselected zones need conditioned air and said selected zones do not need conditioned air by causing the respective damper means associated with said unselected zones to be in the open position and the respective damper means associated with the selected zones to be in the closed position.

* * * * *